John Desmand Ainsworth
APPLICANT

By Miseqades & Douglas
ATTORNEYS 3,475,702
ELECTRICAL FILTERS
John Desmond Ainsworth, Stafford, England, assignor to The English Electric Company Limited, London, England, a British company
Filed Feb. 1, 1966, Ser. No. 524,281
Claims priority, application Great Britain, Feb. 1, 1965, 4,378/65
Int. Cl. H04b 3/04; H01h 7/10
U.S. Cl. 333—17 10 Claims

ABSTRACT OF THE DISCLOSURE

An electrical filter arrangement for use with an A.C. to D.C. power conversion system comprises inductive and capacitive reactive filter elements connected across the A.C. lines. One of the reactive elements is variable and is coupled to a servo motor. Control means responds to the voltage across and the current in the filter arrangement and energises the servo motor in such a sense as to maintain the reactive elements in resonance at a particular harmonic frequency to be rejected.

The invention relates to electrical filter arrangements.

Electrical filter arrangements are used, for example, for the attenuation of unwanted harmonics generated in A.C.-D.C. converters, in particular, three-phase bridge converters used in high voltage D.C. transmission systems. Such harmonics are generated both on the A.C. and D.C. sides of converter, and it is necessary to provide filter circuits to attenuate these harmonics and prevent them from being transmitted to the associated A.C. and D.C. circuits.

Such filters may be series or parallel inductance-capacitance circuits each tuned to a particular harmonic to be expected, e.g. 5th, 7th, 11th, 13th, 17th, 19th and so on. In practice, a tuned filter circuit is provided for at least each of the lower frequency harmonics since these are of the largest amplitude. However, the drawback with such tuned filter circuits is that the temperature coefficients of the components employed, and variations in the A.C. frequency, are effective to detune the filter circuit and reduce the efficiency of the system.

When these harmonic filters are de-tuned their impedance rises, and they may be in partial resonance with the impedance of the associated A.C. circuit resulting in a high harmonic current through this circuit. Since the harmonic voltage developed in this associated circuit is dependent on the harmonic current and resistance it is frequently necessary to restrict the "Q" of each filter circuit to avoid such resonance by increasing the resistance of the filter circiut above that desired, that is, the resistance inherent in the inductor and capacitor elements. Similar difficulties may occur in other applications of filter circuits.

According to one aspect, the present invention consists in an electrical filter arrangement, including an inductive reactive portion providing an inductive reactance, a capacitive reactive portion providing a capacitive reactance, and control means responsive to the current in, and the voltage across, the filter arrangement for automatically adjusting the relative values of the said reactive portions so as to tend to maintain the filter arrangement in resonance at a predetermined frequency.

According to another aspect, the invention consists in an electrical filter arrangement, including an inductive reactive portion providing an inductive reactance, a capacitive reactive portion providing a capacitive reactance, means connecting the inductive reactive portion in series with the capacitive reactive portion, and control means responsive to a voltage signal across the filter arrangement having a predetermined frequency and to a current signal in the filter arrangement having the said predetermined frequency and operative to adjust automatically the relative values of the reactive portions in a direction such as tends to maintain the filter arrangement in resonance at the said predetermined frequency.

According to a further aspect, the invention consists in an electrical filter arrangement, including an inductive reactive portion, a capacitive reactive portion, means connecting the said reactive portions in parallel, and control means responsive to a voltage signal across the filter arrangement having a predetermined frequency and to a current signal in the filter arrangement having the said predetermined frequency and operative to adjust automatically the relative values of the said portions in a direction such as tends to maintain the filter arrangement in resonance at the said predetermined frequency.

Filter arrangements embodying the invention will now be described by way of example, and with reference to the accompanying drawings in which:

FIG. 3(*b*) shows an end view of the inductor of FIG. 3(*a*);

Figure 1:
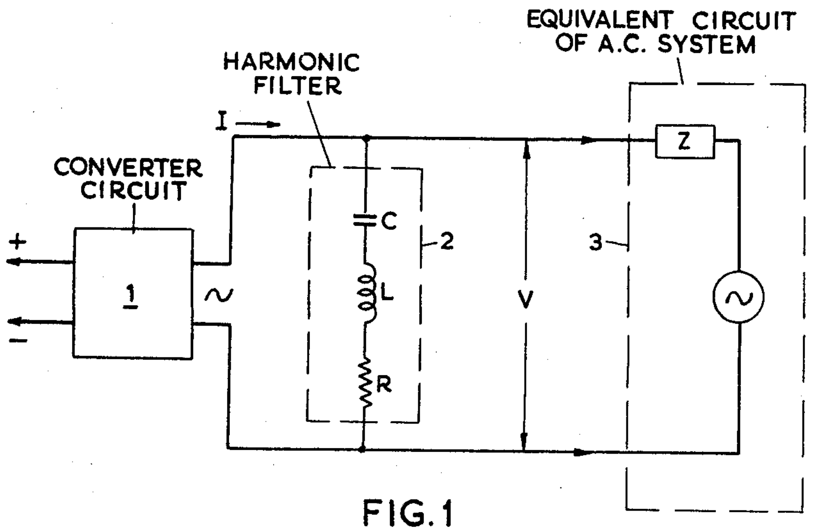
FIG. 1 shows a converter circuit with a conventional harmonic filter across the A.C. lines.

A converter 1 (FIG. 1) is connected between the D.C. and A.C. power lines. Harmonic filters 2, of which only one is shown, are connected across the A.C. lines and the equivalent circuit of the associated A.C. circuit connected to these lines is schematically indicated by the block 3. The filter circuit 2 is liable to be detuned for the reasons outlined above.

Figure 2:
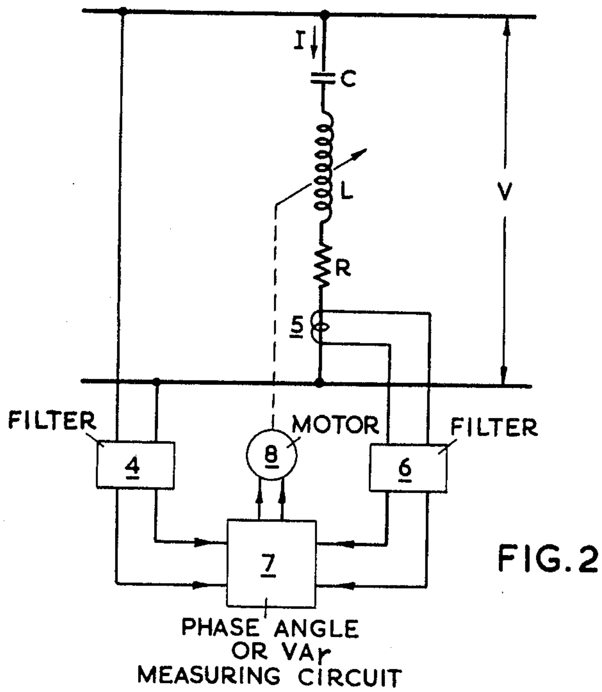
FIG. 2 shows generally a filter arrangement according to this invention.

In FIG. 2 there is shown one form of filter arrangement according to this invention comprising a series tuned harmonic filter including a capacitor C, a variable inductor L and a resistor R connected across the A.C. lines of a converter. A voltage or current proportional to the harmonic voltage V across the harmonic filter is obtained via an auxiliary filter circuit 4. A voltage or current proportional to the harmonic current I in the filter is obtained from a current transformer 5 via a second auxiliary filter circuit 6. The outputs from the two auxiliary filters 4 and 6 are applied to circuit 7 for measuring phase angle $\phi$ between V and I, or reactive volt-amperes, VI times sin $\phi$, of the main filter.

The reason for the provision of the auxiliary filter 4 and 6 is that, in general, there will be appreciable components of current and voltage in the harmonic or main filter at frequencies (e.g. fundamental) other than its nominal resonant frequency. The auxiliary filters 4 and 6 reject these unwanted components and pass to the circuit 7 only the wanted signals, proportional to V and I. The input to auxiliary filter 4 may in practice be obtained from the seocndary of a voltage transformer, and both auxiliary filters 4 and 6 may then be of small size and cost.

A reversible motor 8 is connected to receive the output from the measuring circuit 7 and is arranged to vary the inductance of the inductor L, e.g. through a mechanical or hydraulic coupling, so as to maintain the harmonic filter in resonance. The correction of the tuning of the harmonic filter is thus automatic, and the maximum rate of correction can be realtively small since most de-tuning effects will be realised in response to slow changes in temperature or slow changes in the frequency of the associated A.C. circuit. Thus, the provision of a relatively small geared motor will be adequate even for very high powered filters.

Since the harmonic filter will therefore practically always be in tune, the harmonic voltage on the A.C. lines will never exceed IR, and the resistance R can be that resistance which is inherent in L and C alone, which is very low, so that the "Q" of the filter may be 100 or even greater, which "Q" is defined as $\omega L/R$ and $\omega=2\pi$ times the resonant frequency.

With such a harmonic filter, the reduction in the maximum harmonic voltage may be at least four times greater than that which can be achieved by using nominally fixed components in the filter. The rating of the components employed may also be reduced since no allowance need now be made for any possible magnification due to partial resonance with the impedance of the associated A.C. circuit. Alternatively, the size and cost of the components used may be reduced for the same amount of harmonic filtering as was achieved with fixed components.

As mentioned above, the measuring circuit 7 can be made to respond to the phase angle $\phi$ between V and I, which is the same as the impedance phase angle of the relevant harmonic filter, this being zero at resonance and positive or negative in magnitude on either side of resonance. However, this arrangement has the disadvantage that, in practice this phase angle must be determined from the voltage V and the current I and both of these quantities decrease in value as the converter current is reduced towards zero by its normal control. Thus, the more satisfactory item to measure is the reactive volt amperes, that is, VI sin $\phi$, measured at the harmonic frequency, or alternatively I sin $\phi$ or V sin $\phi$.

If the rotational speed of the motor is arranged to be proportional to one of these latter quantities the system will tend to come to rest with the filter in tune.

Figure 3A:
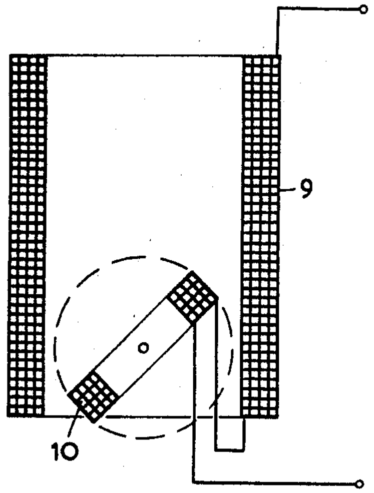
FIG. 3(*a*) shows a sectional view of a variable inductor for use in the arrangement of FIG. 2.
Figure 3B:
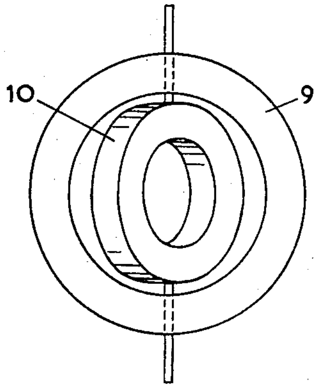

FIGURES 3(*a*) and 3(*b*) illustrate one particular manner of varying the inductance of the inductor L. In particular, this inductor comprises a main coil 9 in the form of a solenoid having a small auxiliary coil 10 connected in series with it, the auxiliary coil being rotably mounted within the solenoid to vary the degree of coupling. Instead, the inductance can be varied by movement of a copper cylinder or ring adjacent a coil, and or by variation of an air gap in a magnetic circuit including the inductor L.

In another arrangement, the inductance is varied by means of tappings or inductive winding controlled by switches operated by the motor to vary the effective number of turns in the winding as in a conventional tapchanger.

Figure 4:
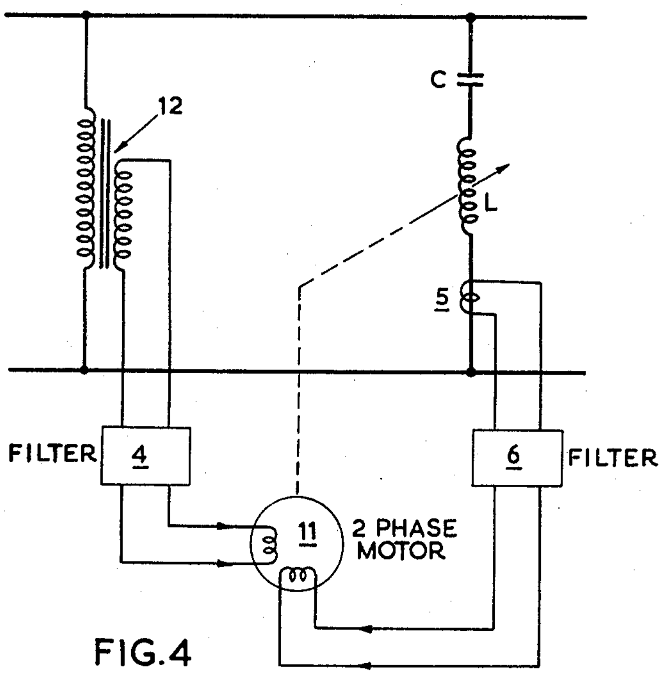
FIG. 4 shows a particular form of the filter arrangement shown in FIG. 2.

In FIG. 4 is shown a two-phase motor 11 having one winding supplied with the harmonic voltage V through a transformer 12 and the auxiliary filter 4, and the other winding supplied with the harmonic current through the auxiliary filter 6. The motor torque is thus approximately proportional to VI sin $\phi$, the reactive volt amperes.

Figure 6:
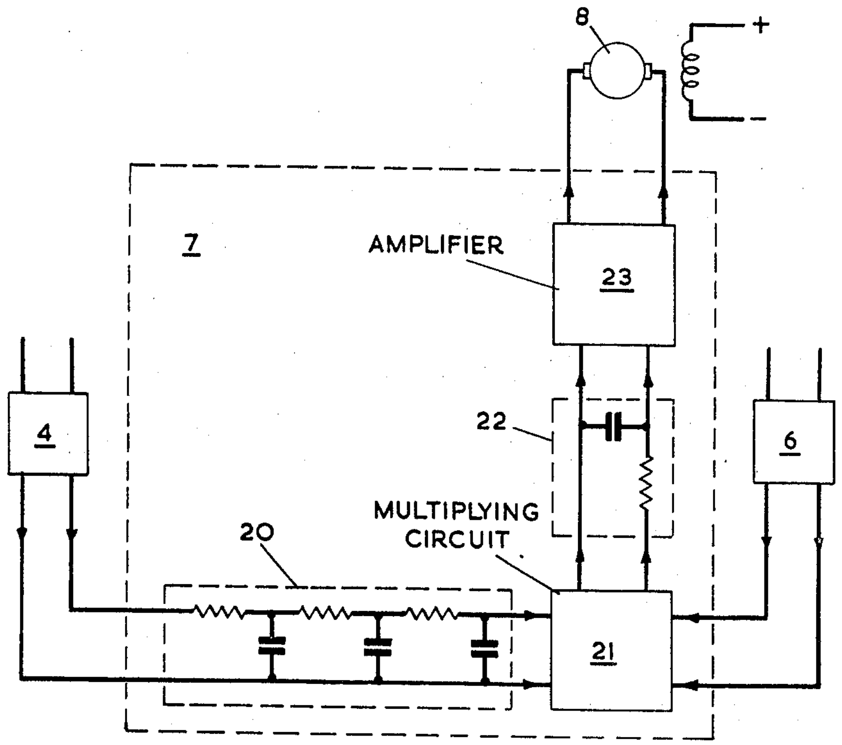
FIG. 6 shows a circuit which may be used in the arrangements of FIGS. 2 and 5.

Another way of obtaining the required control function is to employ electronic multiplying circuits based on mark/space chopper circuits operating at a frequency considerably in excess of the harmonic frequency, or on the Hall effect produced in semi-conductor crystals, which give a mean D.C. output proportional to VI cos $\phi$ for inputs V and I at a relative phase angle $\phi$. One of these two quantities must first be phase shifted by 90° before application to the multiplying circuit. Measuring circuit 7 (FIG. 6) may, for example, contain three circuits 20, 21 and 22. Circuit 20 is an R-C circuit to produce a lag of 90° at the harmonic freqeuncy. Circuit 21 is an electronic multiplying circuit of known type as mentioned above. The voltage and circuit signals from filters 4 and 6 are applied to the two inputs of the multiplier 21, the voltage signal being phase shifted by 90° in circuit 20. The output of circuit 21 is substantially proportional to the instantaneous product of its two inputs, and therefore contains two components, one a D.C. component proportional to the instantaneous product of its two inputs, and therefore contains two components, one a D.C. component proportional to VI sin $\phi$ and the other an A.C. component having twice the frequency. An R-C circuit 22 passes substantially only the D.C. component to an amplifier 23 and thence to the armature of the motor 8, which in this example is a D.C. motor, having a fixed field, to form a continuous servo system as before.

Instead, an on/off servo system may be used, for example by using a dynamometer wattmeter element in the same manner as the multiplying circuit referred to above, again with one of the input quantities being phase displaced by 90°, and fitted with a pair of contacts to drive an A.C. or D.C. motor via two relays, the motor being driven in one or the other direction to correct the tuning. In another arrangement, the electronic multiplying circuit (FIG. 6) is used to supply a pair of D.C. relays arranged to operate when the reactive volt amperes is more positive or more negative than predetermined values, the relays being arranged to operate an A.C. or D.C. motor in one direction or the other to correct the tuning.

Figure 5:
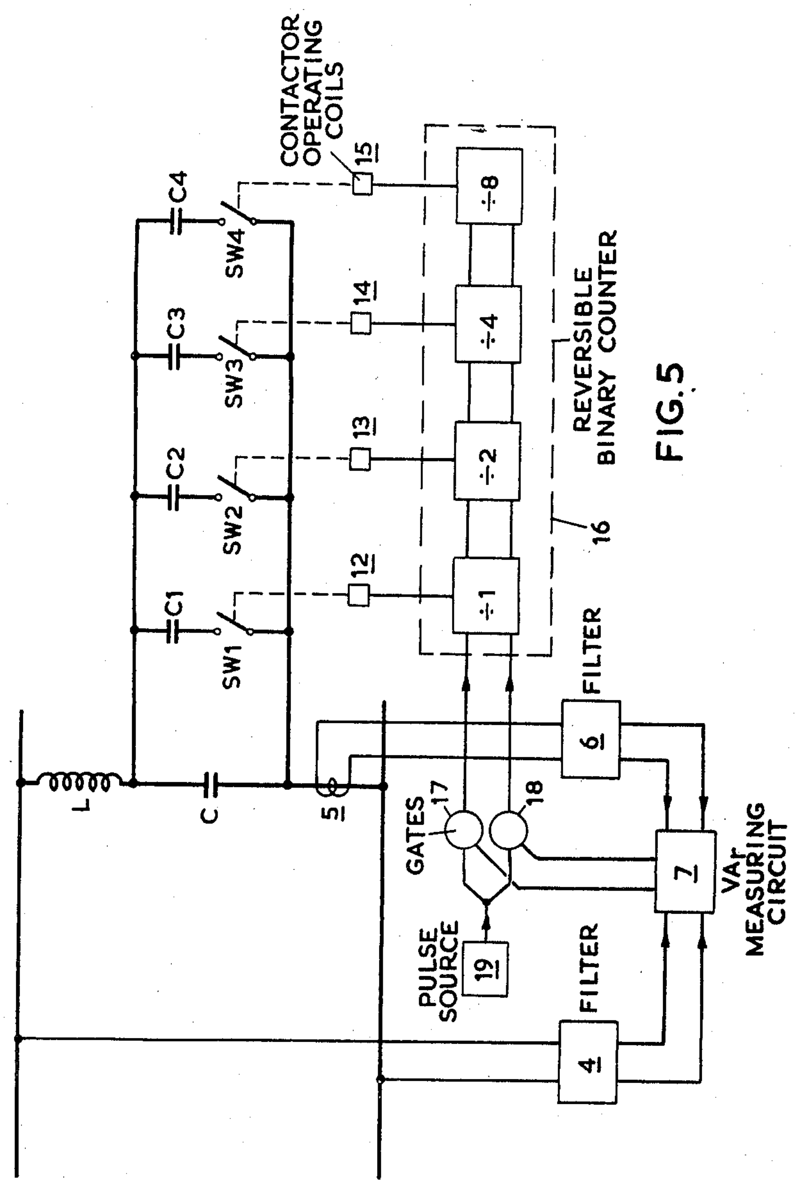
FIG. 5 shows another form of filter arrangement according to this invention.

Referring now to FIGURE 5, there is shown a circuit in which the capacitance of the harmonic filter is varied instead of the inductance. In this circuit any one or more of a plurality of capacitors C1 to C4 can be selectively switched in parallel with the main filter capacitor C by the closure of electro-magnetically operated switches SW1 to SW4 respectively. In particular, the contacts of these switches SW1 to SW4 are operated in response to the energisation and de-energisation of coils 12 to 15, respectively, connected to the divide-by-1, divide-by-2, divide-by-4 and divide-by-8 stages in a reversible binary counter 16. The values of the capacitors C1 to C4 are appropriately in the ratio 1:2:4:8, respectively, to correspond with the associated stages in the binary counter. The counter 16 has a first input from a gate 17 to increase the count, and a second input from a gate 18 to decrease the count of the counter. These gates have a first input connected in common to a pulse source 19, and each gate has a second input connected to the measuring circuit 7. The pulses applied from the source 19 may conveniently be a steady train of pulses having a low frequency, e.g. 1 cycle per second.

In operation, one of these gates is arranged to be opened when the output of the measuring circuit 7 is such as to indicate that the value of the reactive volt amperes is above a predetermined value, and similarly, the other gate is arranged to be opened when the output of the measuring circuit 7 is such as to indicate that the value of the reactive volt amperes is below this predetermined value. Thus, in the event of the harmonic filter being detuned, pulses from the source 19 are admitted either to one or the other input of the counter to drive it in such a sense as to increase or decrease the count registered, and hence switch-in or switch-out of circuit appropriate ones of the capacitors C1 to C4. The total capacitance connected in parallel with the capacitor C may thus either be zero or vary in multiples of the value of capacitor C1 from 1 to 15, so as to correct the tuning of the filter.

Other combinations of capacitor value can alternatively be used, for example, decimal or binary decimal, with the counter being based on the coding appropriate to these combinations.

It may be convenient to arrange to short circuit any selected number of additional capacitors connected in series, instead of in the parallel, with the capacitor C, these additional capacitors themselves being arranged either in a series chain or in parallel with each other.

An arrangement similar to that of FIG. 5, except that inductors (having values related to each other in the manner of a predetermined series) are used in parallel with inductor L instead of capacitors C1 to C4 in parallel with capacitor C, may be constructed.

Although in the filter arrangements described the inductive reactive portion is in series with the capactive portion, it will be appreciated that corresponding filter arrangements can be constructed in which the inductive reactive portion is in parallel with the capactive reactive portion. The various means described above for maintaining the filter arrangements at resonance will in this case be responsive to the harmonic voltage developed across the parallel-connected portions and the harmonic total current flowing in the two portions.

What is claimed is:

1. An electrical filter arrangement for connection to electrical power lines and tending to suppress a predetermined power frequency therein, comprising inductive reactive means, capacitive reactive means connected to the inductive reactive means, at least one of said reactive means being variable, means connecting the two reactive means to the power lines to form a resonatable filter circuit, control means having two inputs, one input connected to receive a signal dependent on the voltage across the resonatable filter circuit and the other input connected to receive a signal dependent on the current in the resonatable filter circuit, two secondary filters tuned to the said predetermined frequency and respectively connected in series with the two said inputs of the control means so that the two said signals are respectively dependent only on the voltage across, and the current in the resonatable filter circuit at the said predetermined frequency, and output means, controlled by said control means, connected to the said one reactive means for automatically adjusting the relative values of the said reactive means in dependence on the two said signals so as to tend to maintain the resonatable filter circuit in resonance at the said predetermined frequency.

2. An arrangement according to claim 1, in which the said control means comprises phase angle detecting means operative to detect the phase angle between the signals respectively received at its two said inputs and to produce an output signal dependent on the phase angle, the output means comprising means connected to receive the output signal and operative in dependence thereon.

3. An arrangement according to claim 1, in which the said control means includes measuring means responsive to the two signals respectively received at the two said inputs for measuring the reactive volt amperes of the said voltage and current at the said predetermined frequency, the said output means comprising means operative to adjust the relative values of the said reactive means so as to tend to reduce the said reactive volt amperes to zero.

4. An arrangement according to claim 3, in which the said measuring means comprises an electronic multiplying circuit connected to the two said inputs and operative to vectorially multiply together the two said signals received by the control means to produce an output signal dependent on the reactive volt amperes of the said voltage and current at the said predetermined frequency, the said output means comprising means operative in dependence on the value of the said output signal.

5. An arrangement according to claim 1, in which the said control means includes measuring means connected to the two said inputs and operative to measure the value of a component of one said signal which is in quadrature with the other said signal and to produce an output signal dependent on the value of the said component, the said output means being operative in dependence on the said output signal.

6. An arrangement according to claim 1, in which the said inductive reactive means comprises a pair of mutually inductively coupled elements, and means mechanically connecting the elements together so as to permit relative movement between them, the arrangement also including means mechanically connecting the said output means to one of the said elements for adjusting the value of the inductive reactive means relative to the capacitive reactive means.

7. An arrangement according to claim 1, in which the control means comprises a two-phase electric motor having a pair of windings respectively connected to the two said inputs of the control means so as to be energised respectively in dependence on the said voltage and the said current at the said predetermined frequency, whereby the motor torque is dependent upon the reactive volt amperes of the said voltage and current at the said predetermined frequency, and means connecting the motor to the said one reactive means.

8. An arrangement according to claim 1, in which the said one reactive means includes a plurality of reactive elements having values related to each other in the manner of a predetermined series, and in which the said control means includes a plurality of electromechanical switches each connected to a respective one of the said elements of the said one reactive means and each switchable between a first position in which the respective one of the reactive elements is connected into the arrangement and a second position in which it is not so connected, a reversible electronic counter responsive to a control signal and having a plurality of stages operable according to the said predetermined series in dependence on a count taken of the control signal, means connecting each stage of the counter to a respective one of the electro-mechanical switches to control its energisation whereby different ones of the said reactive elements are connected into the arrangement according to the count of the said control signal so that the reactance of the said one reactive means varies in dependence upon the count of the control signal, detecting means connected to the two said inputs and responsive to the said voltage and current at the said predetermined frequency to produce an output signal dependent thereon which tends to zero as the filter circuit tends to resonance at the said predetermined frequency, a source of regularly occurring pulses, a first two-input AND gate having one of its inputs connected to the detecting means to receive the said output signal and the other of its inputs connected to the source of regularly occurring pulses, the first AND gate having an output which is energised to produce a said control signal when the said output signal exceeds a first predetermined level and which is connected to the said counter to control the operation of the counter in a first counting direction, and a second two-input AND gate having one of its inputs connected to the detecting means to receive the said output signal and the other of its inputs connected to the source of regularly occurring pulses, the second AND gate having an output which is energised to produce a said control signal when the said output signal exceeds a second predetermined value and which is connected to the said counter to control the operation of the counter in the opposite counting direction, whereby the counter is stepped in the first counting direction to increase the reactance of the inductive reactive means and is stepped in the opposite counting direction to decrease the reactance of the inductive reactive means.

9. An electrical filter arrangement according to claim 1, in which said control means comprises a phase-displacement circuit connected to one said secondary filter to receive one said signal and operative to apply a phase displacement of substantially 90° thereto, and an electronic multiplying circuit having two inputs respectively connected to the said phase-displacement circuit to receive the phase-displaced one of the said signals and to the other said secondary filter to receive the other of the said signals, the electronic multiplying circuit being operative to multiply its two received signals together to produce an output signal dependent on the reactive volt amperes of the voltage across, and the current in, the resonatable filter circuit at the said predetermined frequency, and in which the said output means comprises an electromechanical drive arrangement connected to be energised by the said output signal and mechanically linked to the said one reactive means for adjusting same.

10. An electrical filter arrangement comprising inductive reactive means, capactive reactive means connected to the inductive reactive means, at least one of said reactive means being variable so as to form, with the other reactive means, a resonatable filter circuit, a pair of secondary filters tuned to a common predetermined frequency to be suppressed by the filter arrangement, a voltage transformer having a primary winding connected across the resonatable filter circuit and a secondary winding connected to supply one said secondary filter to produce a first signal dependent on the voltage across the resonatable filter circuit at the said predetermined frequency, a current transformer having a primary winding connected in series with the resonatable filter circuit and a secondary winding connected to supply the other said secondary filter to produce a second signal dependent on the current in the resonatable filter circuit at the said predetermined frequency, control means having two inputs respectively connected to the said secondary filters to receive the first and second signals respectively and operative to produce an output signal dependent thereon which tends to zero as the resonatable filter circuit tends to resonance, and output means connected to the said one reactive means and energised by the said output signal for adjusting the relative values of the said reactive means so as to tend to maintain the resonatable filter circuit in resonance at the said predetermined frequency.

References Cited

UNITED STATES PATENTS

| | | | |
|---|---|---|---|
| 3,293,572 | 12/1966 | Smith | 333—17 |
| 3,117,279 | 1/1964 | Ludwigson | 325—174 |
| 2,786,183 | 3/1957 | Jacks | 333—17 |
| 2,978,655 | 4/1961 | Fernsler | 333—17 |

ELI LIEBERMAN, Primary Examiner

C. BARAFF, Assistant Examiner

U.S. Cl. X.R.

321—69; 333—17, 76; 334—16